Patented July 28, 1942

2,291,521

UNITED STATES PATENT OFFICE 2,291,521

METHOD OF PURIFYING ZINC CONCENTRATES

Carl O. Anderson, Baxter Springs, Kans., Rudolph J. Stengl, Rosiclare, Ill., and Frederick C. Abbott, Tulsa, Okla., assignors to Mahoning Mining Company, Youngstown, Ohio, a corporation of Delaware No Drawing. Application October 30, 1941, Serial No. 417,117

6 Claims. (Cl. 75—1)

This invention relates to the purification of zinc sulfide, or sphalerite, and especially to a novel method of freeing zinc sulfide flotation concentrates or the like from fluorine-bearing contaminants to thereby render the concentrates suitable for use in zinc smelting plants and their sulfur content available for the manufacture of sulfuric acid.

Fluorspar is objectionable in zinc concentrates because its fluorine content is driven off during the roasting, sintering, and perhaps in the retorting (smelting), usually as hydrogen fluoride (HF), and readily attacks the smelter refractories and other parts even when only a very small amount is present and so in time seriously damages the apparatus, while the gases driven off during roasting and sintering cannot be used for making sulfuric acid if they contain even slight amounts of fluorine compounds.

Another objection to the use of zinc concentrates containing fluorspar is that in many communities the liberation of fluorine-bearing gases is prohibited by law and/or regulations of public authorities and the smelters must therefore make some provision for eliminating any fluorine content before discharging gaseous smelter wastes into the atmosphere.

Consequently, most smelters, even though not engaged in sulfuric acid manufacture, refuse to accept concentrates containing appreciable fluorspar, while those who will accept concentrates containing up to possibly 1% of it generally exact penalties in the form of lower prices to the concentrate producers.

It has therefore been extremely difficult to successfully commercialize certain large deposits of fluorine-bearing sphalerite, such, for example, as those in the Cave-In Rock district of southern Illinois, where ores relatively rich in zinc sulfide occur in fairly large quantities, since because of the fluorspar in the ore the zinc concentrates produced therefrom cannot be entirely freed of it by flotation and there has been no commercially satisfactory way of otherwise eliminating it.

We are familiar with the method of removing fluorspar from zinc concentrates described and claimed in U. S. Patent 2,137,600, issued November 22, 1938, to F. C. Abbott et al., but have found in practice that this method, while effective to reduce the fluorspar content of the concentrates to small fractions of 1%, is a slow process and not fully effective to remove all, or all but an imperceptible trace, of the fluorine unless prolonged for uneconomic periods of time. Therefore, although capable of giving good results apart from the questions of time and operating convenience, the said method has not entirely solved the problem from a commercial standpoint.

The present invention is accordingly directed to the complete elimination of all perceptible traces of fluorine from zinc concentrates and the like and is especially concerned with the provision of an industrially acceptable method of purification to render them suitable for use in zinc smelters and innocuous to sulfuric acid manufacturing units associated therewith.

It is, consequently, a principal object of the invention to provide a novel method for producing fluorine-free zinc sulfide from concentrates derived from raw or native sphalerite ores which are contaminated with fluorspar.

Another object of the invention is the provision of a method for treating zinc sulfide concentrates to eliminate contained fluorspar in a relatively short time and with a minimum of labor and reagent expense, whereby fluorine-free zinc sulfide competitive with that obtained from ores devoid of fluorspar can be produced from sphalerite-fluorspar ores.

A further object is to provide a method of treating zinc sulfide concentrates with sulfuric acid in the presence of boric acid sufficient to constitute a stoichiometrical equivalent of the fluorine present in the concentrates whereby the fluorspar contamination in the latter is entirely decomposed without appreciably affecting their zinc sulfide content.

A still further object is to provide a method of purifying fluorspar-contaminated zinc sulfide concentrates by removing in soluble form all of the fluorine released by decomposition of the fluorspar in excess sulfuric acid under conditions which minimize attack by the acid upon the zinc sulfide content of the concentrates.

Other objects, purposes and advantages of the invention will hereinafter more fully appear or will be understood from the description of its practice in the treatment of a zinc sulfide concentrate produced by flotation from a fluorspar-contaminated zinc sulfide ore.

In the preferred practice of our method, especially when it is being used for treating flotation concentrates, the latter are taken directly from the flotation circuit as the final cleaned zinc sulfide froth the density of which as it comes from the flotation circuit is usually about 40% solids and for best results we initially thicken it in a suitable thickener or in any other convenient way to about 55-65% solids in order to avoid too great dilution of subsequently added reagents, while if dry concentrates are used we supply water to produce a slurry of like consistency, that is, sufficient water to make up about 40% of the total mass.

The said reagents include sulfuric acid and a boron-bearing compound, and when the concentrates, as is usual, contain up to about 1% of fluorspar we thoroughly mix with the thickened mass or slurry about 75-100 pounds of the sulfuric acid (66° Bé.) and about 8-10 pounds of boric acid ($H_3BO_3$) per ton of dry solids in the feed. The mixture is preferably maintained in constant agitation while heat is supplied to it to keep its temperature relatively constant at, preferably, about 50°-90° C. until certain reactions, hereinafter more fully described, are complete.

The entire mass, initially having about 5.75-8.50% sulfuric acid concentration in solution, receives some spontaneous agitation from ebullition of carbon dioxide evolved in reaction between the sulfuric acid and minor quantities of calcite ($CaCO_3$) usually present in zinc concentrates, but it is generally preferable to supply some suitable form of mechanical means as well for agitating it, while the moderate heat required may be provided by the use of a steam jacket about the reaction vessel or in any other convenient way.

The principal reactions whereby the fluorspar is converted to soluble form cannot be set forth with absolute certainty, but the sum of the chemical changes which occur is believed to correspond substantially to the following equation:

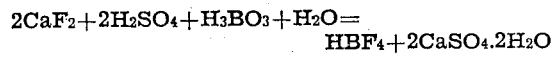
$$2CaF_2 + 2H_2SO_4 + H_3BO_3 + H_2O = HBF_4 + 2CaSO_4 \cdot 2H_2O$$

It will be noted that this equation does not contemplate production of any hydrofluoric acid and while it is theoretically possible that some of the sulfuric acid may react directly with the fluorspar to produce it and that it, in turn, as well as the sulfuric acid itself, may react with and thus decompose some of the zinc sulfide, we have found the proportion of the zinc content of the original feed decomposed and lost in the actual practice of our method is so small as to be insignificant; we have therefore concluded that the reaction which produces the highly soluble hydrofluoboric acid probably proceeds so rapidly that hydrofluoric acid is only briefly present, if at all, and that the calcium released from the fluorspar reacts immediately with part of the excess sulfuric acid to reduce the acidity of the mass as a whole so that no appreciable attack of the zinc sulfide by either the fluorine ion or the excess sulfuric acid occurs.

While we have referred to boric acid as the boron-bearing reagent preferably used in our method, it will be understood that certain salts of boron and perhaps other boron-bearing compounds may serve equally well and be substituted therefor, although our investigations have indicated that some such compounds, for example, the sodium and calcium borates, while satisfactory chemically, introduce certain operative difficulties which generally tend to militate against their use.

Completion of the reactions sought in accordance with our method is marked by conversion of the entire fluorine content of the concentrates to soluble state or condition, as can readily be ascertained by test as when analysis of a washed sample of the solids in the mass shows no trace of fluorine; the attainment of this condition usually requires a period of time in the neighborhood of one to four hours depending to some extent upon the temperature maintained, since at the higher temperatures within the range mentioned the reactions proceed to completion in the shorter periods of time.

After such reduction of the fluorine to soluble condition it is separated from the remaining solids and the latter thereby completely freed of this impurity by subsequent operations which may be of any desired or suitable character, as the specific mechanical procedure employed for recovering the purified concentrates from the slurry forms no part of the invention.

Thus, if corrosion-resistant filtering means are readily available this separation can be effected directly and the filter cake, after washing, can be dried and used as fluorine-free zinc concentrates in the normal way. However, if the filtering means or other apparatus available is of a character susceptible to attack by the residual sulfuric acid or other constituents in the mass, the latter is preferably diluted with water upon completion of the aforesaid reaction and then thickened, resulting in removal in the thickener overflow of a large proportion of the acid and soluble constituents, including the fluoride, principally as hydrofluoboric acid, and soda ash or other basic reagent may then be added to the underflow to neutralize whatever residual acidity may remain.

Of course, the maintenance of an elevated temperature is not required during the operations performed after completion of the primary reactions and no effort need be made to keep the mass heated, so the final filtration is normally carried out at room temperature and produces a filter cake which after washing, preferably first with water and then, if necessary, with a weak alkali wash to insure complete neutralization of any last traces of acidic constituents, is ready for sale or other disposition similarly to fluorine-free zinc sulfide flotation concentrates obtained from ores not contaminated with fluorspar.

Our investigations have indicated that the herein described method can be utilized for removing substantially any quantity of fluorspar from zinc concentrates without material loss of zinc values but in view of the present relatively high cost of boric acid and other boron-bearing reagents adapted for use in the practice of the method, we now prefer to employ the latter only for purifying zinc concentrates which have been largely freed from fluorspar by other methods. Thus, when zinc concentrates are recovered by flotation from the finely divided ore, it is usually not difficult to keep the fluorspar contamination of the concentrates in the neighborhood of 2.5% or less and for economical production of a fluorine free end product it is preferable that this be done. It follows, however, that if, for any reason, the removal of larger quantities of fluorspar by the present method should prove more economical than an initial flotation or other concentration followed by purification in accordance with the invention, the latter may be used for removing the entire fluorine content of the zinciferous ore.

It will, however, be appreciated that the amount of boric acid or other boron-bearing reagent used should be adjusted to correspond to, or preferably slightly exceed, the stoichiometric equivalent of the fluorspar in the concentrates to insure conversion of all of the fluorine to hydrofluoboric acid or other soluble compound and permit its complete extraction in solution. Moreover, while we have stated we prefer to employ about 75–100 pounds of sulfuric acid (66° Bé.) for treating concentrates containing about 1% fluorspar, which amount is appreciably in excess of the stoichiometric equivalent of the latter, we normally substantially exceed that equivalent, though not necessarily in the same ratio, when treating concentrates containing larger quantities of fluorspar.

It will now be apparent our invention permits the production from fluorspar-containing concentrates of fluorine-free zinc sulfide which is as acceptable to operators of zinc smelters and sulfuric acid plants as zinc sulfide produced from naturally fluorspar-free ores, and that the practice of the invention does not entail the use of extremely high temperatures, unduly prolonged reaction times, delicate balancing of reagents, or, save for the reaction apparatus itself, employment of acid proof equipment.

While we have herein described with considerable particularity a specific treatment for purifying flotation concentrates or other finely divided zinciferous material, it will be understood that the practice of the invention is not to be limited or confined thereto in any way as changes and modifications in the performance of the several steps, the sequence of operations, and their relation to each other will readily occur to those skilled in the art and may be made, if desired, without departing from the spirit and scope of the invention as defined in the appended claims, in which, as throughout this specification, the term "concentrates" is employed generically to designate finely divided material however derived from zinc sulfide ores.

Having thus described our invention, we claim and desire to protect by Letters Patent of the United States:

1. A method of freeing zinc sulfide concentrates of a fluorine content present as calcium fluoride which comprises subjecting the concentrates at moderately elevated temperatures to the action of sulfuric acid in substantial excess of the stoichiometrical equivalent of the fluorine and in the presence of a boron-bearing compound in not less than the substantial stoichiometrical equivalent thereof for a time sufficient to decompose the calcium fluoride, and then separating the fluorine in water soluble form from the solid concentrates.

2. A method of freeing zinc sulfide concentrates of a fluorine content present as calcium fluoride which comprises subjecting the concentrates at moderately elevated temperatures to the action of sulfuric acid in a slurry containing approximately 100 pounds of the acid per ton of dry concentrates in the presence of sufficient boric acid to provide boron in substantial stoichiometric equvalency to the fluorine in the concentrates, maintaining the slurry at a moderately elevated temperature less than 100° C. for a time sufficient to effect complete decomposition of the calcium fluoride, then separating the liquid from the solids and washing the latter to thereby remove therefrom in solution the fluorine content of said fluoride.

3. A method of purifying finely divided fluorspar-bearing zinc sulfide having a calcium fluoride content approximating 1%, which comprises the steps of mixing with a water pulp of the sulfide about 100 pounds of sulfuric acid and about 8 to about 10 pounds of boric acid per ton of the dry sulfide, maintaining the mixture at a moderately elevated temperature until conversion of the fluorine content of the fluorspar to relatively highly soluble compounds and then separating said soluble compounds in solution from the undissolved sulfide.

4. The method of removing fluorine from zinc sulfide concentrates containing calcium fluoride, which comprises digesting the concentrates in water with sulfuric acid in substantial excess and a boron-bearing compound in relatively small excess of the respective stoichiometric equivalents of the calcium fluoride present in the concentrates while supplying heat to the mass to maintain its temperature from about 50° C. to about 90° C. for a time of the order of one to four hours to thereby fully decompose the fluoride and then filtering and washing the concentrates to remove the fluorine therefrom in solution.

5. In a method of purifying fluorspar-contaminated zinc concentrates, the steps of mixing with a water pulp of the concentrates containing about 60% solids, about 100 pounds of concentrated sulfuric acid per ton of dry solids in the pulp and a sufficient quantity of a boron-bearing compound to provide an appreciable excess of boron over the stoichiometrical equivalent of the fluorine present and agitating the mixture at an elevated temperature not exceeding about 90° C.

6. In a method of purifying zinc concentrates contaminated by the presence of approximately 1% of calcium fluoride, the steps of mixing with a water pulp of the concentrates containing about 60% solids, about 100 pounds of concentrated sulfuric acid and about 8 to about 10 pounds of boric acid per ton of dry solids in the pulp and agitating the mixture while maintaining its temperature from about 50° C. to about 90° C.

CARL O. ANDERSON.
RUDOLPH J. STENGL.
FREDERICK C. ABBOTT.

CERTIFICATE OF CORRECTION.

Patent No. 2,291,521.                               July 28, 1942.

CARL O. ANDERSON, ET AL.

It is hereby certified that error appears in the printed specification of the above numbered patent requiring correction as follows: Page 1, first column, line 2, for "zince" read --zinc--; page 2, second column, line 28, for "fluoride" read --fluorine--; and that the said Letters Patent should be read with this correction therein that the same may conform to the record of the case in the Patent Office.

Signed and sealed this 1st day of September, A. D. 1942.

(Seal)                                      Henry Van Arsdale,
                                              Acting Commissioner of Patents.